(12) United States Patent
Cho et al.

(10) Patent No.: US 12,083,923 B2
(45) Date of Patent: Sep. 10, 2024

(54) SYSTEM FOR REPLACING BATTERY OF MOBILITY

(71) Applicants: HYUNDAI MOTOR COMPANY, Seoul (KR); KIA CORPORATION, Seoul (KR)

(72) Inventors: Kyu Hoon Cho, Suwon-si (KR); Yong Hyun Nam, Anyang-si (KR); Chung Sik Yim, Anyang-si (KR); Dae Hee Lee, Incheon (KR); Sang Hyun Jung, Hwaseong-si (KR); Jae Seung Lee, Hwaseong-si (KR); Jae Young Choi, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 566 days.

(21) Appl. No.: 17/307,516

(22) Filed: May 4, 2021

(65) Prior Publication Data
US 2022/0144125 A1 May 12, 2022

(30) Foreign Application Priority Data

Nov. 6, 2020 (KR) .......................... 10-2020-0147721

(51) Int. Cl.
*B60L 53/80* (2019.01)
*B60K 1/04* (2019.01)
(Continued)

(52) U.S. Cl.
CPC ................ *B60L 53/80* (2019.02); *B60K 1/04* (2013.01); *B60S 5/06* (2013.01); *B64U 50/39* (2023.01);
(Continued)

(58) Field of Classification Search
CPC ... B60L 53/80; B60S 5/06; B60K 2001/0455; B60K 200/0472; B60K 2001/0488;
(Continued)

(56) References Cited

U.S. PATENT DOCUMENTS 5,373,910 A * 12/1994 Nixon .................... B60L 50/66
180/68.5
8,858,152 B1 * 10/2014 McDaniel .............. B60L 50/64
414/398
(Continued)

FOREIGN PATENT DOCUMENTS

CN 105774506 A * 7/2016
CN 106586017 A * 4/2017 ................ B60S 5/06
(Continued)

OTHER PUBLICATIONS

EPO machine translation of CN 111776240 A (original CN document published Oct. 16, 2020) (Year: 2020).*

*Primary Examiner* — David A Testardi
(74) *Attorney, Agent, or Firm* — Lempia Summerfield Katz LLC (57) ABSTRACT

A system for replacing a battery of a mobility is proposed and includes: a battery mounting part provided on an outer surface of a mobility and having a mounting space defined therein, the mounting space being open to an outside, with a battery mounted in the mounting space, and a battery replacement module having a new battery provided therein and mounting the new battery in the mounting space of the battery mounting part after removing the existing battery to be replaced by rotating the new battery and the existing battery together when the battery replacement module approaches the battery mounting part of the mobility.

10 Claims, 5 Drawing Sheets

(51) Int. Cl.
 B60S 5/06 (2019.01)
 B64U 50/39 (2023.01)
 B60K 1/00 (2006.01)

(52) U.S. Cl.
 CPC .............................. *B60K 2001/005* (2013.01); *B60K 2001/0405* (2013.01)

(58) Field of Classification Search
 CPC .......... B60K 2001/0494; H01M 10/42; H01M 1/04207; H01M 50/204; B64U 50/39
 See application file for complete search history.

(56) References Cited

U.S. PATENT DOCUMENTS

| | | | | |
|---|---|---|---|---|
| 2010/0181129 A1* | 7/2010 | Hamidi | ................... | B60L 53/80 180/68.5 |
| 2011/0025268 A1* | 2/2011 | Davidovitch | ........... | B60L 50/66 320/109 |
| 2011/0251935 A1* | 10/2011 | German | ................ | G06Q 40/12 700/218 |
| 2012/0091955 A1* | 4/2012 | Gao | ........................ | B60L 58/21 320/109 |
| 2014/0356670 A1* | 12/2014 | Haug | ................... | H01M 50/249 29/854 |
| 2014/0360010 A1* | 12/2014 | Haug | ...................... | B60L 53/65 29/623.1 |
| 2015/0151624 A1* | 6/2015 | Yamada | ................... | B60K 1/04 180/68.5 |
| 2017/0327091 A1* | 11/2017 | Capizzo | .................... | C25B 9/17 |
| 2018/0041053 A1* | 2/2018 | Capizzo | .................. | A63H 30/04 |
| 2018/0154789 A1* | 6/2018 | Janku | ....................... | B60K 1/04 |
| 2018/0312069 A1* | 11/2018 | McClymond | ........... | B60L 53/51 |
| 2020/0406780 A1* | 12/2020 | Hassounah | ............. | B60L 53/53 |
| 2021/0261017 A1* | 8/2021 | Uiterloo | .............. | H01M 50/249 |
| 2021/0380019 A1* | 12/2021 | Livingston | .............. | B60L 58/12 |
| 2022/0041299 A1* | 2/2022 | Wankewycz | ........... | B64D 27/24 |

FOREIGN PATENT DOCUMENTS

| | | | | | |
|---|---|---|---|---|---|
| CN | 109229077 A | * | 1/2019 | ................. | B60S 5/06 |
| CN | 111267790 A | * | 6/2020 | ............. | B60L 53/80 |
| CN | 111776240 A | * | 10/2020 | | |
| CN | 213414215 U | * | 6/2021 | | |
| DE | 102010045997 A1 | * | 11/2011 | .............. | B60K 1/04 |
| KR | 10-2016-0024984 A | | 3/2016 | | |
| WO | WO-2016001719 A1 | * | 1/2016 | .............. | B60K 1/04 |
| WO | WO-2018230818 A1 | * | 12/2018 | .............. | B64C 1/12 |
| WO | WO-2021164859 A1 | * | 8/2021 | | |

* cited by examiner

TYPE A

TYPE B

FIG. 5

TYPE A​ ​ ​ ​ ​ ​ ​ ​ ​ ​ ​ ​ ​ ​ ​ TYPE B

SYSTEM FOR REPLACING BATTERY OF MOBILITY

CROSS REFERENCE TO RELATED APPLICATION

The present application claims priority to and the benefit of Korean Patent Application No. 10-2020-0147721, filed on Nov. 6, 2020, the entire contents of which are incorporated herein by reference.

FIELD

The present disclosure relates to a system for replacing a battery of a mobility and a battery replacement module.

BACKGROUND

The statements in this section merely provide background information related to the present disclosure and may not constitute prior art.

With the recent rapid development of battery-related industries, batteries are widely used not only in various electronic devices and mobile devices, but also in a ground mobility such as an electric vehicle and in an air mobility such as a drone. When the size of a battery is small, the battery can be easily replaced. However, when the battery is mounted in a mobility such as a vehicle or an urban air mobility, it takes a considerable amount of time to replace the battery and the replacement system of the battery is inevitably complicated.

As the power or performance of a mobility such as a vehicle or an urban air mobility to which a battery is mounted increases, the size or performance of the mounted battery inevitably increases. In this case, it is difficult to replace the battery of the mobility, and the rapid replacement of the battery is difficult, which affects power supply and increases power cut-off time.

The foregoing is intended merely to aid in the understanding of the background of the present disclosure, and is not intended to mean that the present disclosure falls within the purview of the related art that is already known to those skilled in the art.

SUMMARY

The present disclosure provides a system for replacing a battery of a mobility structure, which uses a battery mounting part provided on the outer surface of a mobility structure and defining a mounting space that is configured to mount an existing battery therein, and a battery replacement module configured to approach the battery mounting part, rotate the new battery and the existing battery, remove the existing battery from the mounting space, and mount the new battery in the mounting space.

In one form, the present disclosure provides a system for replacing a battery of a mobility structure, the system including: a battery mounting part provided on an outer surface of the mobility structure and defining a mounting space that is open to an outside and is configured to mount a battery therein, and a battery replacement module including a new battery installed therein and configured to, when the battery replacement module approaches the battery mounting part of the mobility structure, rotate the new battery and the existing battery together, remove the existing battery, and mounting the new battery in the mounting space.

A replacement space open to the outside and allowing the new battery to be mounted therein may be defined in the battery replacement module, wherein when the battery replacement module approaches the battery mounting part, the replacement space and the mounting space of the battery mounting part may match each other to define an inner space, and in the inner space, the existing battery to be replaced and the new battery may be rotated together, so the battery of the mobility structure may be replaced.

Each of the existing battery to be replaced and the new battery may be formed to have a semi-cylindrical shape, and when the battery replacement module approaches the battery mounting part, the existing battery to be replaced and the new battery may be in close contact with each other to form a cylindrical shape, whereby the battery replacement module may rotate the existing battery to be replaced and the new battery forming the cylindrical shape in a circumferential direction thereof.

A replacement space open to the outside and allowing the new battery to be mounted therein may be defined in the battery replacement module, wherein each of the mounting space and the replacement space may have a shape of a semi-cylindrical groove open to the outside, and when the battery replacement module approaches the battery mounting part, the mounting space and the replacement space may match each other to define a cylindrical space, whereby in the cylindrical space, the existing battery to be replaced and the new battery may be rotated together, so the battery of the mobility may be replaced.

A driving part may be provided in the battery replacement module, wherein when the battery replacement module approaches the battery mounting part, the driving part may rotate the new battery, so due to the rotation of the new battery, the existing battery to be replaced may be rotated together with the new battery.

The coupling part may be provided in the battery replacement module or the battery mounting part, wherein when the battery replacement module approaches the battery mounting part, the coupling part may couple the battery replacement module and the battery mounting part to each other.

A combination part may be provided in the battery mounting part, the combination part inhibiting the battery from being removed from the mounting space when the battery is mounted in the mounting space.

The combination part may be a combination groove formed inside the mounting space, and a combination protrusion or a combination roller may be provided on the battery, whereby the combination protrusion or the combination roller may be fitted to the combination groove such that the battery is inhibited from being removed from the mounting space.

A rotation stopper may be provided in the battery mounting part, wherein when the new battery and the existing battery to be replaced are rotated together to be replaced with each other, the rotation stopper may hold the existing battery to be replaced at a predetermined position thereof and stop the rotations of the new battery and the existing battery to be replaced.

A contact part may be provided on the battery or in the mounting space of the battery mounting part, the contact part electrically connections the battery to the mobility when the battery is mounted in the mounting space.

A cooler may be provided in the battery mounting part and remove heat generated by the battery.

The battery mounting part may be provided on a lower end of an air mobility, and the battery replacement module may be assembled with the battery mounting part on the lower end of the air mobility, whereby the battery replacement module may remove the existing battery to be replaced from the battery mounting part and mount the new battery in the mounting space of the battery mounting part.

The battery replacement module may be provided on an upper end of a ground mobility or air mobility, wherein the ground mobility or air mobility having the battery replacement module may approach the lower end of the air mobility having the battery mounting part on the ground or in the air and may assemble the battery replacement module with the battery mounting part.

Wheels may be provided in the ground mobility such that the around mobility drives on the ground and approaches the lower end of the air mobility, and a propeller may be provided in the air mobility such that the air mobility flies in the air and approaches the lower end of the air mobility.

The system for replacing a battery of a mobility of the present disclosure uses the battery mounting part provided on the outer surface of a mobility and having the mounting space formed therein, with a battery mounted in the mounting space, and the battery replacement module mounting a new battery in the mounting space after removing the existing battery to be replaced from the mounting space by approaching the battery mounting part and rotating the new battery and the existing battery together, thereby enabling the replacement of the existing battery with the new battery.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
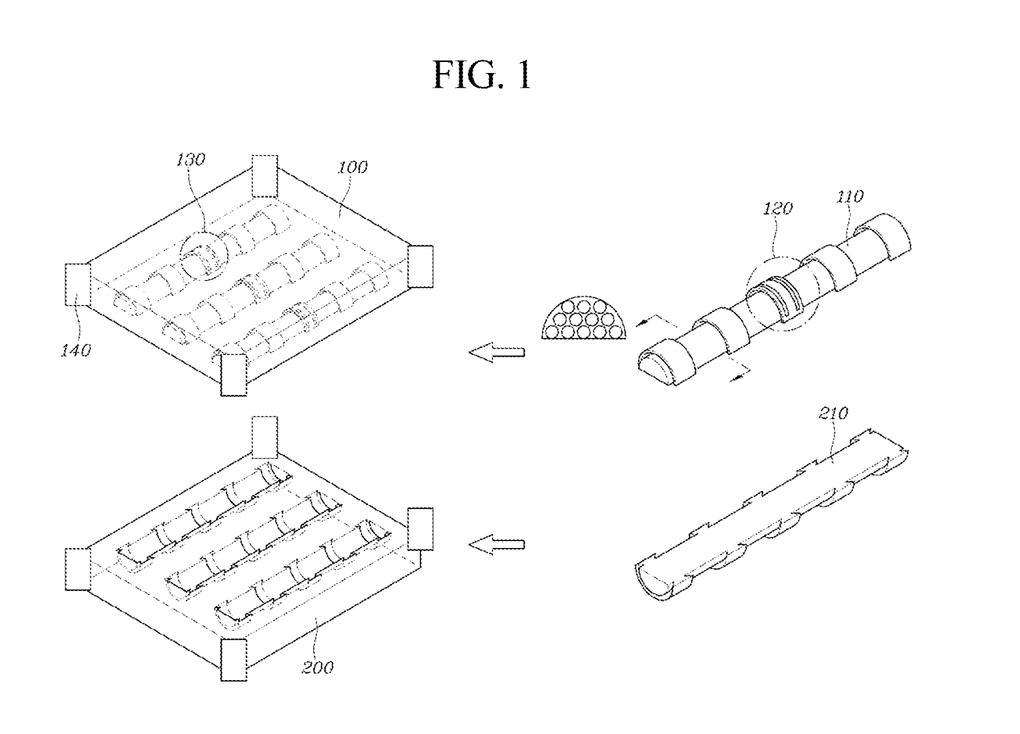
FIG. 1 is a view illustrating a battery mounting part, a battery replacement module, and batteries of a system for replacing a battery of a mobility according to one form of the present disclosure.
Figure 2:
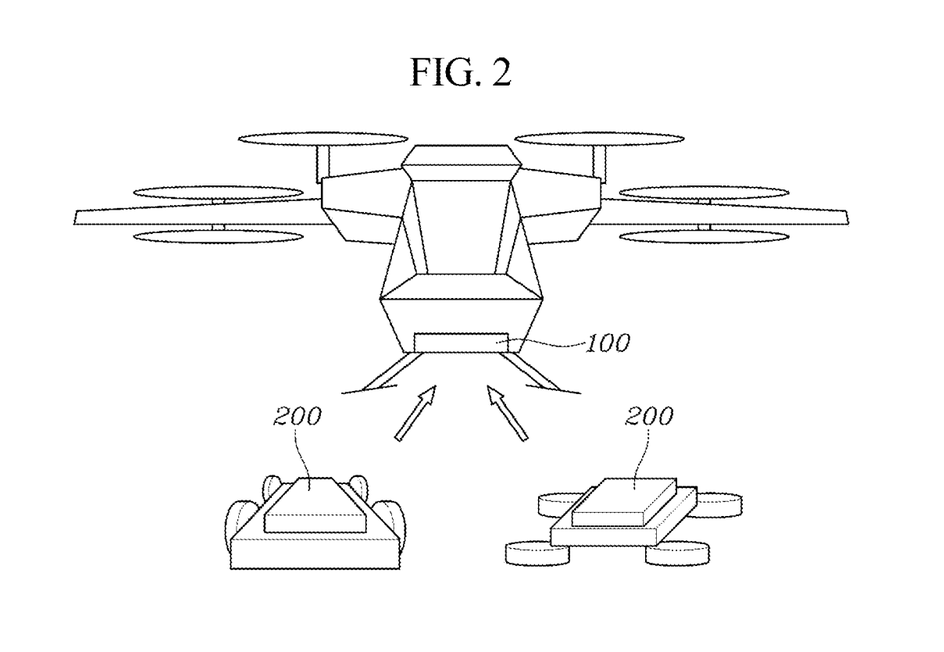
FIG. 2 is a view illustrating the replacement of a battery of an air mobility by using the system for replacing a battery of a mobility according to one form of the present disclosure.
Figure 3:
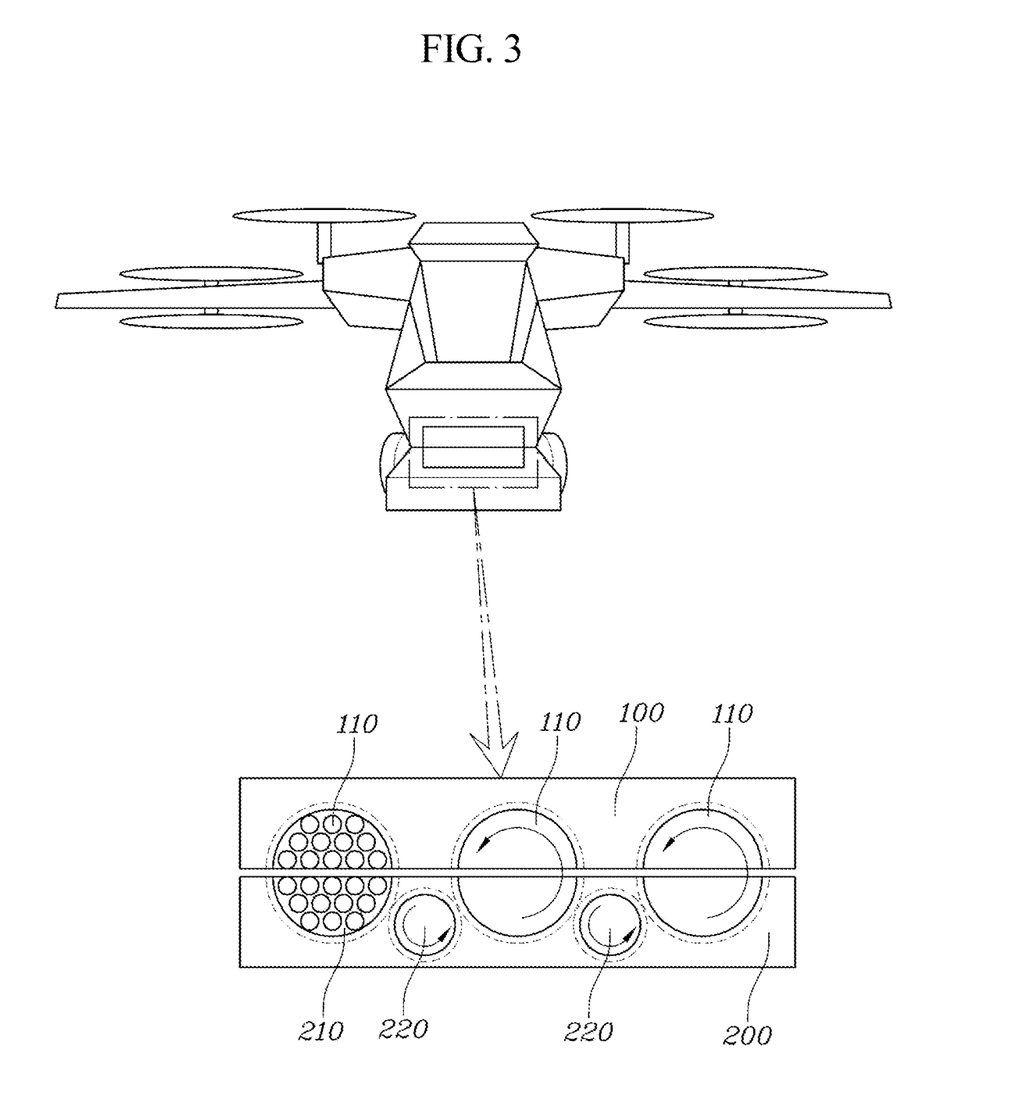
FIG. 3 is a view illustrating the replacement of the battery of the air mobility after the battery replacement module is combined with the battery mounting part of the air mobility in the system for replacing a battery of a mobility according to one form of the present disclosure.
Figure 4:
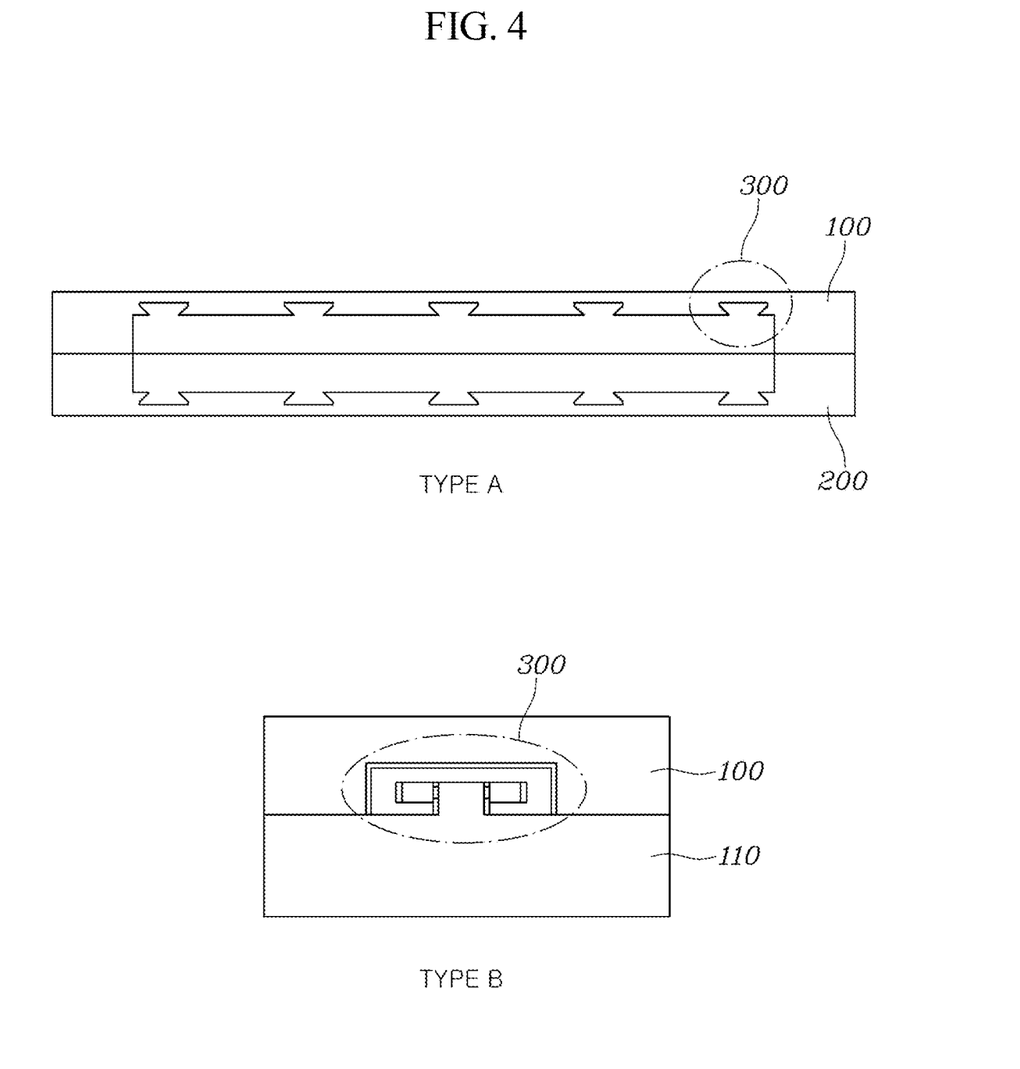
FIG. 4 is a view illustrating a combination part allowing the battery to be mounted to the battery mounting part in the system for replacing a battery of a mobility according to one form of the present disclosure.
Figure 5:
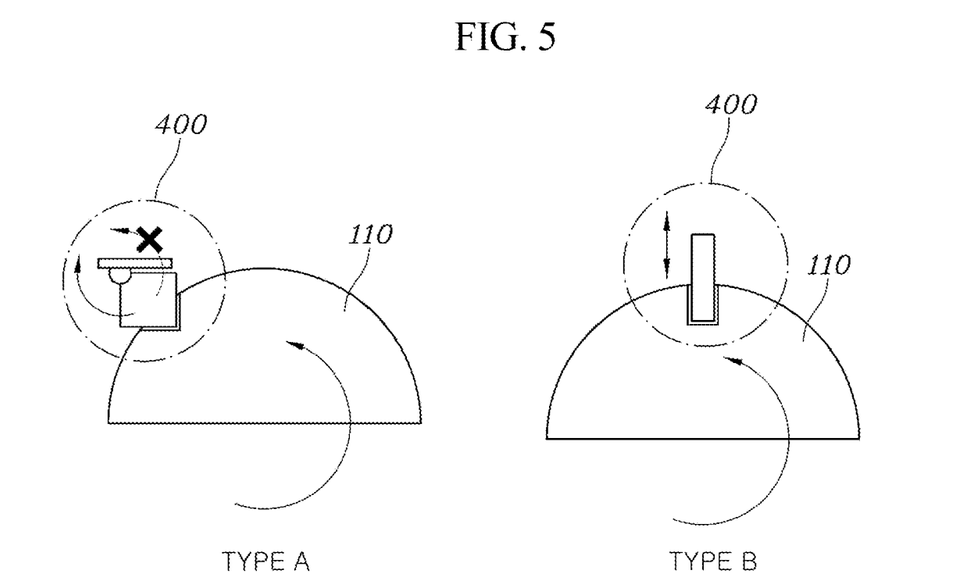
FIG. 5 is a view illustrating a rotation stopper inhibiting the rotation of the battery after the battery is mounted to the battery mounting part in the system for replacing a battery of a mobility according to one form of the present disclosure.

FIG. 1 is a view illustrating a battery mounting part, a battery replacement module, and batteries of a system for replacing a battery of a mobility according to one form of the present disclosure. FIG. 2 is a view illustrating the replacement of a battery of an air mobility by using the system for replacing a battery of a mobility according to one form of the present disclosure. FIG. 3 is a view illustrating the replacement of the battery of the air mobility after the battery replacement module is combined with the battery mounting part of the air mobility in the system for replacing a battery of a mobility according to one form of the present disclosure. FIG. 4 is a view illustrating a combination part allowing the battery to be mounted to the battery mounting part in the system for replacing a battery of a mobility according to one form of the present disclosure. FIG. 5 is a view illustrating a rotation stopper inhibiting the rotation of the battery after the battery is mounted to the battery mounting part in the system for replacing a battery of a mobility according to one form of the present disclosure.

FIG. 1 illustrates the battery mounting part, the battery replacement module, and the batteries of the system for replacing a battery of a mobility according to one form of the present disclosure. FIG. 3 illustrates the replacement of the battery of the air mobility after the battery replacement module is combined with the battery mounting part of the air mobility in the system for replacing a battery of a mobility according to one form of the present disclosure. The system for replacing a battery of a mobility according to one form of the present disclosure includes: the battery mounting part 100 provided on the outer surface of the mobility and having a mounting space defined therein, the mounting space being open to the outside, with an existing battery 110 mounted in the mounting space; and the battery replacement module 200 having a new battery 210 installed therein and mounting the new battery 210 in the mounting space of the battery mounting part 100 after removing the existing battery 110 to be replaced by rotating the new battery 210 and the existing battery 110 together when the battery replacement module 200 approaches the battery mounting part 100 of the mobility.

According to the system for replacing a battery of a mobility according to one form of the present disclosure, the battery replacement module 200 is combined with the battery mounting part 100 outside the mobility and rotates the new battery 210 and the existing battery 110 together by rotating the new battery 210, so that the existing battery 110 to be replaced is removed to the battery replacement module 200, and the new battery 210 is mounted to the battery mounting part 100. Each of the batteries is mechanically rotated to replace the existing battery to be replaced, so the existing battery to be replaced can be easily and rapidly replaced. In addition, the battery mounting part 100 may be mounted to various structures aside from the mobility, and supply power to the structures, and the existing battery to be replaced may be replaced by the battery replacement module 200. Alternatively, the battery replacement module 200 may be mounted to each of various structures and a mobility may park or land on the structure such that the existing battery to be replaced is easily replaced.

In addition, in the system for replacing a battery of a mobility according to one form of the present disclosure, a replacement space is formed in the battery replacement module 200, the replacement space being open to the outside and allowing the new battery 210 to be mounted therein, wherein when the battery replacement module 200 approaches the battery mounting part 100, the replacement space matches the mounting space of the battery mounting part 100 to define an inner space, and the existing battery 110 to be replaced and the new battery 210 are rotated together in the inner space, so the existing battery of the mobility can be replaced.

Specifically, the existing battery 110 to be replaced is mounted in the mounting space of the battery mounting part 100, and the new battery 210 is mounted in the replacement space of the battery replacement module 200. The battery mounting part 100 is provided on the outer surface of a mobility, and during the replacement of the existing battery, the battery replacement module 200 is combined with the battery mounting part 100, and rotates the new battery 210 of the replacement space. Due to the rotation of the new battery 210, a torque is applied to the existing battery 110 to be replaced which is mounted in the mounting space of the battery mounting part 100. Accordingly the new battery 210 and the existing battery 110 to be replaced are rotated together. Finally, after the existing battery 110 is replaced with the new battery 210 by the rotation of each of the batteries, the existing battery 110 to be replaced is removed to the replacement space of the battery replacement module 200, and the new battery 210 is mounted in the mounting space of the battery mounting part 100.

Meanwhile, in the system for replacing a battery of a mobility according to one form of the present disclosure, each of the existing battery 110 to be replaced and the new battery 210 is formed to have a semi-cylindrical shape, and when the battery replacement module 200 approaches the battery mounting part 100, the existing battery 110 to be replaced and the new battery 210 are in close contact with each other to form a cylindrical shape, whereby the battery replacement module 200 may rotate the existing battery 110 to be replaced and the new battery 210 forming the cylindrical shape in a circumferential direction thereof. Furthermore, the replacement space open to the outside and allowing the new battery 210 to be mounted therein is defined in the battery replacement module 200, wherein each of the mounting space and the replacement space has the shape of a semi-cylindrical groove open to the outside, and when the battery replacement module 200 approaches the battery mounting part 100, the mounting space and the replacement space match each other to define a cylindrical space, whereby in the cylindrical space, the existing battery 110 to be replaced and the new battery 210 are rotated together, so the existing battery to be replaced can be replaced.

Specifically, the mounting space and the replacement space are defined in the battery mounting part 100 and the battery replacement module 200, respectively, each of the mounting space and the replacement space having a semi-cylindrical shape. The existing battery 110 and the new battery 210 are also formed to have the semi-cylindrical shapes in accordance with the shapes of the mounting space and the replacement space and are mounted in the mounting space and the replacement space, respectively. Each of the existing battery 110 and the new battery 210 is formed to have the semi-cylindrical shape, and thus when combined with each other, the existing battery 110 and the new battery 210 form one cylindrical shape to be easily rotated, whereby each of the batteries is easily rotated even by small power and the existing battery 110 of the battery mounting part 100 may be easily and simply replaced.

In addition, in the system for replacing a battery of a mobility according to one form of the present disclosure, a driving part 220 is provided in the battery replacement module 200. When the battery replacement module 200 approaches the battery mounting part 100, the driving part 220 rotates the new battery 210, and due to the rotation of the new battery 210, the existing battery 110 to be replaced is rotated together with the new battery. The driving part 220 is provided as an actuator such as a gear and a motor, and is provided on the inner circumferential surface of the replacement space of the battery replacement module 200 and is in contact with the new battery 210. The driving part 220 rotates the new battery 210 by using a roller or the gear. Due to the rotation of the new battery 210, a torque is applied to the existing battery 110 of the battery mounting part 100, so the existing battery 110 is rotated together with the new battery 210. In the case in which each of the batteries is formed to have the semi-cylindrical shape, each of the batteries is more easily rotated even by small power, so the existing battery 110 can be easily replaced.

Meanwhile, in the system for replacing a battery of a mobility according to one form of the present disclosure, a coupling part 140 is provided in the battery replacement module 200 or the battery mounting part 100. When the battery replacement module 200 approaches the battery mounting part 100, the coupling part 140 may couple the battery replacement module 200 and the battery mounting part 100 to each other. The coupling part 140 may be provided on each vertex of parts on which the battery replacement module 200 and the battery mounting part 100 are coupled to each other. Each of the coupling parts 140 allows the battery replacement module 200 and the battery mounting part 100 to be coupled to each other by an electromagnet or by the coupling of a pin to a hole such that the existing battery to be replaced is replaced. The coupling parts 140 allow the new battery 210 and the existing battery 110 located in the battery replacement module 200 and the battery mounting part 100, respectively, to meet at a matching position such that the existing battery 110 is replaced with the new battery 210.

FIG. 4 illustrates the combination part allowing the battery to be mounted to the battery mounting part in the system for replacing a battery of a mobility according to one form of the present disclosure. In the system for replacing a battery of a mobility according to one form of the present disclosure, the combination part 300 is provided in the battery mounting part 100. When a battery is mounted in the mounting space, the combination part 300 can inhibit the battery from being removed from the mounting space. In addition, the combination part 300 is a combination groove formed inside the mounting space, and a combination protrusion or a combination roller is provided on a battery. The combination protrusion or the combination roller is fitted to the combination groove such that the battery is inhibited from being removed from the mounting space.

Specifically, during the mounting or replacement of a battery, the battery is mounted in the battery mounting part 100 so as not to be removed therefrom. The mounting of the battery is maintained due to the combination part 300. The combination groove is formed along the outer circumferential surface of the inside of each of the mounting space of the battery mounting part 100 and the battery replacement module 200. The combination groove acts as a rotating path in which the battery slides and rotates during the replacement of the battery. The battery has the combination protrusion or the combination roller provided thereon, and is moved along the combination groove during the replacement of the existing battery. After the replacement of the existing battery, a new battery is fitted to the combination groove and the mounting of the new battery in the combination groove is maintained. In this case, when the combination roller of the new battery is fitted to the combination groove, the new battery rolls. Accordingly, during the replacement of the new battery, the new battery rolls efficiently and can be easily replaced.

FIG. 5 illustrates the rotation stopper inhibiting the rotation of the battery after the battery is mounted to the battery mounting part in the system for replacing a battery of a mobility according to one form of the present disclosure. In the system for replacing a battery of a mobility according to one form of the present disclosure, the rotation stopper 400 is provided in the battery mounting part 100. When the new battery 210 and the existing battery 110 to be replaced are rotated together to be replaced with each other, the rotation stopper 400 holds the existing battery 110 at a predetermined position thereof and stops the rotations of the new battery 210 and the existing battery 110.

Specifically, after the new battery 210 and the existing battery 110 to be replaced are replaced with each other by being rotated together in a predetermined direction, the new battery 210 stops the rotation thereof at a predetermined position of the battery mounting part 100 and is mounted therein. Accordingly, the rotation stopper 400 is composed of a spring and a stop protrusion and allows a battery to rotate in a predetermined direction, for example, only counterclockwise, and a groove is formed in the outer surface of the battery. Accordingly, when the battery rotates up to a predetermined point, the spring allows the stop protrusion to be fitted to the groove of the battery, so the rotation of the battery stops. Furthermore, the rotation stopper 400 is composed of an actuator and a lock bar. During the rotation of the battery, the lock bar is removed from the groove of the battery, and when the rotation of the battery stops, the lock bar is fitted to the groove of the battery such that the rotation of the battery stops.

Meanwhile, in the system for replacing a battery of a mobility according to one form of the present disclosure, a contact part 120 or 130 is provided in the existing battery 110 or the mounting space of the battery mounting part 100, respectively. When the battery is mounted in the mounting space, the contact part 120 or 130 may electrically connect the battery to the mobility. The contact part 120 or 130 is configured as an electrode contact type, and the battery mounting part 100 and the battery are in contact with each other by electrode contact without separate cable connection therebetween, so the battery and the mobility are electrically connected to each other. When the battery is mounted in the mounting space of the battery mounting part 100 or when a new battery is mounted in the mounting space after the existing battery is replaced with the new battery, the electrode provided in the mounting space of the battery mounting part 100 is in contact with the electrode of the new battery mounted in the mounting space, so the new battery is easily connected electrically to the mobility and can supply power to the mobility. The electrode of the battery having a semi-cylindrical shape may be provided along the outer circumferential surface thereof. The electrode of the battery mounting part 100 may be provided at a position of the mounting space at which the electrode of the battery is located during the mounting of the battery in the mounting space such that the electrode of the battery mounting part is in contact with the electrode of the battery. When the battery is mounted in the mounting space, the electrode provided in the mounting space of the battery mounting part 100 may maintain a contact area with the electrode of the battery via a spring or a plate spring.

In addition, in the system for replacing a battery of a mobility according to one form of the present disclosure, a cooler is provided in the battery mounting part 100, and may remove heat generated by the battery. The cooler is provided at a position adjacent to the battery of the battery mounting part 100, and cools the battery, thereby inhibiting performance deterioration and overheating of the battery.

FIG. 2 illustrates the replacement of the battery of the air mobility by using the system for replacing a battery of a mobility according to one form of the present disclosure. In the system for replacing a battery of a mobility according to one form of the present disclosure, the battery mounting part 100 is provided on the lower end of the air mobility, and the battery replacement module 200 is combined with the battery mounting part 100 on the lower end of the air mobility, whereby the battery replacement module removes the existing battery 110 from the battery mounting part and mounts the new battery 210 in the mounting space of the battery mounting part 100.

Furthermore, the battery replacement module 200 is provided on the upper end of a around mobility or air mobility, wherein the around mobility or air mobility having the battery replacement module may approach the lower end of the air mobility having the battery mounting part on the ground or in the air and may combine the battery replacement module 200 with the battery mounting part 100. Accordingly, wheels are provided in the ground mobility such that the ground mobility drives on the ground and approaches the lower end of the air mobility, and a propeller is provided in the air mobility such that the air mobility flies in the air and approaches the lower end of the air mobility.

Meanwhile, the battery replacement module 200 is not limited to be mounted to a mobility, but may be located on a fixed position such as a structure. Accordingly, when the battery replacement module 200 is provided on the ground mobility or the air mobility, the ground mobility or the air mobility approaches a moving mobility by driving or flying, respectively, and the existing battery of the moving mobility can be rapidly replaced by the battery replacement module 200. When the battery replacement module 200 is located on a fixed position such as a structure, a mobility having the battery mounting part mounted thereto moves and parks or lands on the structure, and the battery replacement module 200 is combined with the battery mounting part 100, so the existing battery of the mobility can be replaced.

Although the exemplary form of the present disclosure has been described for illustrative purposes, those skilled in the art will appreciate that various modifications, additions and substitutions are possible, without departing from the scope and spirit of the disclosure.

What is claimed is:

1. A system for replacing a battery of a mobility structure, the system comprising:
    a battery mounting part provided on an outer surface of the mobility structure and defining a mounting space that is open to an outside and is configured to mount a battery therein;
    a battery replacement module including a new battery installed therein and configured to:
        when the battery replacement module approaches the battery mounting part of the mobility structure, rotate an existing battery mounted in the mounting space and the new battery together,
        remove the existing battery from the mounting space, and
        mount the new battery in the mounting space; and a driving part provided in the battery replacement module and configured to, when the battery replacement module approaches the battery mounting part, rotate the new battery, wherein the existing battery is rotated together with the new battery due to the rotation of the new battery,
wherein the battery mounting part is provided on a lower end of an air mobility structure, and the battery replacement module is configured to be assembled with the battery mounting part on the lower end of the air mobility structure,
wherein the battery replacement module is provided on an upper end of a second air mobility structure, and
wherein the upper end of the second air mobility structure is configured to approach the lower end of the air mobility structure, in the air, so that the battery replacement module of the second air mobility structure is combined with the battery mounting part of the air mobility structure.

2. The system of claim 1, wherein the battery replacement module defines a replacement space that is open to the outside and is configured to mount the new battery therein,
wherein when the battery replacement module approaches the battery mounting part, the replacement space and the mounting space of the battery mounting part match each other and define an inner space, and in the inner space, the existing battery and the new battery are rotated together.

3. The system of claim 1, wherein:
each of the existing battery and the new battery is formed in a semi-cylindrical shape, and
when the battery replacement module approaches the battery mounting part, the existing battery and the new battery are in close contact with each other and form a cylindrical shape, and the battery replacement module rotates the existing battery and the new battery forming the cylindrical shape in a circumferential direction thereof.

4. The system of claim 3, wherein:
the battery replacement module defines a replacement space that is open to the outside and is configured to mount the new battery therein,
each of the mounting space and the replacement space is formed in a shape of a semi-cylindrical groove that is open to the outside, and
when the battery replacement module approaches the battery mounting part, the mounting space and the replacement space match each other and define a cylindrical space, and the existing battery and the new battery are rotated together in the cylindrical space.

5. The system of claim 1, further comprising a coupling part provided in the battery replacement module or the battery mounting part,
wherein when the battery replacement module approaches the battery mounting part, the coupling part is configured to couple the battery replacement module and the battery mounting part to each other.

6. The system of claim 1, further comprising a combination part provided in the battery mounting part and configured to inhibit a battery from being removed from the mounting space when the battery is mounted in the mounting space.

7. The system of claim 6, further comprising a combination protrusion or a combination roller provided on the battery,
wherein the combination part is a combination groove formed inside the mounting space, and the combination protrusion or the combination roller is configured to be fitted to the combination groove.

8. The system of claim 1, further comprising a rotation stopper provided in the battery mounting part,
wherein when the new battery and the existing battery are rotated together, the rotation stopper is configured to:
hold the existing battery at a predetermined position, and
stop rotations of the new battery and the existing battery.

9. The system of claim 1, further comprising a contact part provided on a battery or in the mounting space of the battery mounting part, the contact part configured to electrically connect the battery to the mobility structure when the battery is mounted in the mounting space.

10. The system of claim 1, wherein the second air mobility structure includes a propeller and is configured to fly and approach the lower end of the air mobility structure in air.

\* \* \* \* \*